US009683183B2

(12) United States Patent
Zhao et al.

(10) Patent No.: US 9,683,183 B2
(45) Date of Patent: Jun. 20, 2017

(54) METHOD FOR DEEP DESULFURIZATION OF GASOLINE (71) Applicant: CHINA UNIVERSITY OF PETROLEUM—BEIJING, Beijing (CN)

(72) Inventors: Liang Zhao, Beijing (CN); Jinsen Gao, Beijing (CN); Chunming Xu, Beijing (CN); Tianzhen Hao, Beijing (CN); Xiaona Han, Beijing (CN)

(73) Assignee: CHINA UNIVERSITY OF PETROLEUM—BEIJING, Beijing (CN)

( * ) Notice: Subject to any disclaimer, the term of this patent is extended or adjusted under 35 U.S.C. 154(b) by 0 days.

(21) Appl. No.: 14/929,247

(22) Filed: Oct. 30, 2015

(65) Prior Publication Data

US 2016/0222304 A1 Aug. 4, 2016

Related U.S. Application Data (63) Continuation of application No. PCT/CN2015/075887, filed on Apr. 3, 2015.

(30) Foreign Application Priority Data

Feb. 4, 2015 (CN) .......................... 2015 1 0058453
Feb. 4, 2015 (CN) .......................... 2015 1 0059386
Feb. 4, 2015 (CN) .......................... 2015 1 0059630

(51) Int. Cl.
*C10G 67/16* (2006.01)
*C10G 67/00* (2006.01)
(Continued)

(52) U.S. Cl.
CPC .............. *C10G 67/16* (2013.01); *B01J 20/04* (2013.01); *B01J 20/18* (2013.01); *B01J 20/20* (2013.01);
(Continued)

(58) Field of Classification Search
CPC ...... C10G 67/16; C10G 25/003; C10G 25/12; C10G 45/08; C10G 45/12; C10G 67/00
See application file for complete search history.

(56) References Cited

U.S. PATENT DOCUMENTS 5,582,714 A * 12/1996 Forte ...................... C10G 21/16
208/227
6,103,105 A   8/2000 Cooper et al. ................ 208/210
(Continued)

FOREIGN PATENT DOCUMENTS

CN   1664075 A   9/2005
CN   1782034 A   6/2006
(Continued)

OTHER PUBLICATIONS

Chinese First Examination Report of corresponding China patent application No. 201510059630.0, dated Oct. 19, 2015.
(Continued)

*Primary Examiner* — Brian McCaig
(74) *Attorney, Agent, or Firm* — J.C. Patents (57) ABSTRACT The present invention provides a method for deep desulfurization of gasoline. The method includes steps of: cutting a gasoline feedstock into light, medium, and heavy gasoline fractions; the medium gasoline fraction being subjected to adsorption desulfurization to obtain a desulfurized medium gasoline fraction; the heavy gasoline fraction being subjected to selective hydrodesulfurization to obtain a desulfurized heavy gasoline fraction; mixing the light gasoline fraction with the desulfurized medium gasoline fraction and the desulfurized heavy gasoline fraction to obtain a desulfurized gasoline, where, a cutting temperature of the light and the medium gasoline fractions is 35-60° C., a cutting temperature of the medium and the heavy gasoline fractions is 70-130° C. The method according to the present invention
(Continued)

not only can realize deep desulfurization of gasoline, but also has a less loss of octane number.

14 Claims, 6 Drawing Sheets

(51) Int. Cl.
| | |
|---|---|
| *C10G 25/12* | (2006.01) |
| *C10G 45/08* | (2006.01) |
| *C10G 45/12* | (2006.01) |
| *C10G 25/00* | (2006.01) |
| *B01J 20/04* | (2006.01) |
| *B01J 20/18* | (2006.01) |
| *B01J 20/20* | (2006.01) |
| *B01J 20/30* | (2006.01) |
| *B01J 20/32* | (2006.01) |

(52) U.S. Cl.
CPC ....... *B01J 20/3071* (2013.01); *B01J 20/3078* (2013.01); *B01J 20/3085* (2013.01); *B01J 20/3204* (2013.01); *B01J 20/3236* (2013.01); *C10G 25/003* (2013.01); *C10G 25/12* (2013.01); *C10G 45/08* (2013.01); *C10G 45/12* (2013.01); *C10G 67/00* (2013.01); *B01J 2220/42* (2013.01); *C10G 2300/202* (2013.01); *C10G 2400/02* (2013.01)

(56) References Cited

U.S. PATENT DOCUMENTS

| | | | |
|---|---|---|---|
| 2004/0055933 A1 | 3/2004 | Groten et al. | 208/57 |
| 2005/0173297 A1* | 8/2005 | Toida | B01J 20/165 208/14 |
| 2005/0258077 A1 | 11/2005 | Landau et al. | 208/244 |
| 2007/0261993 A1* | 11/2007 | Nicolaos | C10G 25/12 208/213 |
| 2013/0240405 A1* | 9/2013 | Kumar | C10G 25/00 208/57 |

FOREIGN PATENT DOCUMENTS

| | | |
|---|---|---|
| CN | 101283074 A | 10/2008 |
| CN | 102061194 A | 5/2011 |
| CN | 102764630 A | 11/2012 |
| CN | 103074106 A | 5/2013 |
| CN | 103074107 A | 5/2013 |
| CN | 104277875 A | 1/2015 |

OTHER PUBLICATIONS

The Chinese International Search Report of corresponding international PCT application No. PCT/CN2015/075887, dated Oct. 26, 2015.

The Chinese First Examination Report of corresponding China patent application No. 201510059386.8, dated Dec. 1, 2015.

* cited by examiner

METHOD FOR DEEP DESULFURIZATION OF GASOLINE

CROSS-REFERENCE TO RELATED APPLICATIONS

This application is a continuation of International Application No. PCT/CN2015/075887, filed on Apr. 3, 2015, which claims the priority benefits of Chinese Patent Application No. 201510059630.0, 201510059386.8 and 201510058453.4, which were filed on Feb. 4, 2015. The contents of the above identified applications are incorporated herein by reference in their entireties.

FIELD OF THE TECHNOLOGY

The present invention relates to a desulfurization method and, in particular, to a method for deep desulfurization of gasoline.

BACKGROUND

As worldwide environmental regulations are becoming more strict, people place a higher requirement upon quality of gasoline products. For instance, China has implemented State IV discharge criteria for oil products nationwide since Jan. 1, 2014, which requires sulfur content of gasoline to be reduced below 50 ppm; meanwhile, China has also put forward State V discharge criteria, which requires sulfur content to be reduced below 10 ppm and olefin content to be controlled below 24%.

Compared with developed countries, China's gasoline has a relatively high content of sulfur, which is mainly due to the fact that about 70-80% of China's gasoline comes out from a fluid catalytic cracking (FCC) process. In the gasoline products, about 90% of olefin content and sulfur content comes out from the fluid catalytic cracking gasoline, which causes that China's gasoline products are far from meeting a requirement for new criteria where sulfur content ≤10 ppm and olefin content ≤24%. Thus, reduction of sulfur content in the fluid catalytic cracking gasoline is a key to upgrading quality of China's motor gasoline.

Hydrodesulfurization is the most effective method to remove sulfide from gasoline. Sinopec Research Institute of Petroleum Processing developed an FCC gasoline selective hydrodesulfurization process (RSDS-I) in 2001, where FCC gasoline is firstly cut into a light fraction and a heavy fraction at a cutting temperature of 90° C., and then the light fraction is subjected to alkali extraction mercaptan removal, and the heavy fraction is subjected to selective hydrodesulfurization using a main catalyst of RSDS-I and a protective agent of RGO-2; and in a second generation of FCC gasoline selective hydrodesulfurization technique (RSDS-II) for improvements on the process above, a cutting point of the light fraction and heavy fraction is decreased to 70° C., and a second generation of hydrogenation catalysts RSDS-21 and RSDS-22 are used in a selective hydrodesulfurization portion of the heavy fraction.

Axens Corporate of French Institute of Petroleum (IFP) developed a Prime-G+ process, where a process flow of full range pre-hydrogenation, light and heavy gasoline cutting and heavy fractions selective hydrodesulfurization is used, and the cutting temperature is set between 93-149° C. according to a target value of sulfur content, and during the full range pre-hydrogenation process, light sulfide reacts with diolefin in the presence of a catalyst of HR845 to form sulfide with a high boiling point, thus olefin is not saturated; furthermore, two catalysts of HR806 and HR841 are used in the selective hydrodesulfurization of the heavy fraction, thus the operation is more flexible.

Sinopec Fushun Research Institute of Petroleum and Petrochemicals developed an OCT-M process, where FCC gasoline is cut into light and heavy fractions at a cutting temperature of 90° C., in which the light fraction is subjected to demercaptan and the heavy fraction is subjected to selective hydrodesulfurization using a combined catalyst of FGH-20/FGH-11.

Hai shunde Special Oil Co., Ltd developed an HDDO series diolefin removal catalyst, an HDOS series deep hydrodesulfurization catalyst, an HDMS series mercaptan removal catalyst and a corresponding FCC gasoline selective hydrodesulfurization process (CDOS), where FCC gasoline is subjected to diolefin removal reaction at a relatively low temperature in a hydrogen condition, then the FCC gasoline is cut into light and heavy components, the heavy fraction is subjected to deep hydrodesulfurization, and the hydrogenated heavy fraction is reconciled with the light fraction to obtain a clean gasoline with less sulfur.

The above techniques have a common problem that the light fraction formed by the cutting has a low yield, and there are fewer components having a content less than 10 ppm, and it is difficult to reduce sulfur content of the light fraction below 10 ppm by means of mercaptan removal only; when gasoline products having sulfur content less than 10 ppm are produced, a majority of light fraction still need to be hydrodesulfurized, thus loss of octane number of full range gasoline is higher (for instance, up to 3.0-4.0). Furthermore, even though the sulfur content is allowed to be less than 10 ppm by means of hydrodesulfurization, there are still defects that investment and operational costs are high, and a large number of olefin is saturated while sulfide is removed, which not only increases hydrogen consumption, but also reduces octane number of gasoline greatly.

The adsorption desulfurization may be carried out at a room temperature and atmospheric pressure with low energy consumption and almost no loss of octane number, which is a relatively potential method for deep desulfurization, and which is reported mostly at present. For instance, an IRVAD technique jointly developed by Black & Veatch Pritchard Inc. and Alcoa Industrial Chemicals employs multi-stage fluidized bed adsorption method, which uses an aluminum oxide substrate as a selective solid adsorbent to process liquid hydrocarbons, during the adsorption, the adsorbent is countercurrent in contact with the liquid hydrocarbons, the used adsorbent countercurrently reacts with a regenerated thermal current (such as hydrogen) for regeneration. A desulfurization rate of this technique can reach above 90%, however, this adsorbent is of less selectivity, sulfur adsorption capacity thereof is limited, and the regeneration process is relatively complex.

Philips Petroleum Company developed an S-Zorb process where a specific adsorbent is used for desulfurization in a hydrogen condition, the adsorbent takes zinc oxide, silicon dioxide and aluminium oxide as a carrier and loads metal components such as Co, Ni, Cu, etc., which can absorb a sulfur atom in sulfide to maintain it on the adsorbent, whereas the hydrocarbon structure part of the sulfide is released back to the process stream so as to implement a desulfurization process. This process does not generate $H_2S$ during the reaction, thereby preventing $H_2S$ from reacting with olefin again to generate mercaptan. However, the desulfurization technique places a relatively harsh requirement upon process operation conditions, the temperature of the desulfurization reaction is 343-413 and the pressure is 2.5-2.9 MPa.

The adsorbent of desulfurization described above cannot be better used in the selective hydrodesulfurization of the heavy fraction due to problems such as limited deep desulfurization and small sulfur adsorption capacity, low selectivity, short lifespan, relatively complex regeneration process and harsh desulfurization conditions. Thus, there is a pressing demand to develop a method for deep desulfurization of gasoline, of which loss of octane number is less, desulfurization degree is highly deep, and the operation is convenient and flexible.

SUMMARY

The present invention provides a method for deep desulfurization of gasoline, which is used to solve said problems in the prior art such as limited deep desulfurization of the method for desulfurization of gasoline and great loss of octane number.

The present invention provides a method for deep desulfurization of gasoline, including steps of:

cutting a gasoline feedstock into a light gasoline fraction, a medium gasoline fraction, and a heavy gasoline fraction;

the medium gasoline fraction being subjected to adsorption desulfurization to obtain a desulfurized medium gasoline fraction;

the heavy gasoline fraction being subjected to selective hydrodesulfurization to obtain a desulfurized heavy gasoline fraction; and mixing the light gasoline fraction with the desulfurized medium gasoline fraction and the desulfurized heavy gasoline fraction to obtain a desulfurized gasoline;

wherein, a cutting temperature of the light and the medium gasoline fractions is 35-60° C., and a cutting temperature of the medium and the heavy gasoline fractions is 70-130° C.

In the present invention, the gasoline feedstock may be fluid catalytic cracking gasoline, coking gasoline, etc.; the cutting refers to cutting of the gasoline feedstock into light, medium and heavy gasoline fractions according to a distillation range from low to high, where a distillation range of the medium gasoline fraction is from a range of 35-60° C. to a range of 70-130° C.

In an embodiment, before cutting the gasoline feedstock into the light, the medium and the heavy gasoline fractions, the gasoline feedstock is firstly subjected to demercaptan treatment.

In another embodiment, before the mixing, the light gasoline fraction is firstly subjected to demercaptan treatment to obtain a demercaptan light gasoline fraction, and then the demercaptan light gasoline fraction is mixed with the desulfurized medium gasoline fraction and the desulfurized heavy gasoline fraction to obtain the desulfurized gasoline.

In the present invention, a conventional method may be used for the demercaptan treatment, such as an alkali extraction method or a mercaptan conversion method. The alkali extraction method uses an alkali solution to extract mercaptan therein for its removal, the amount of alkali contained in the alkali solution may be 5-50%, a volume ratio of oil to alkali may be (1-15):1, an operating temperature may be 10-60° C.; the mercaptan conversion method is to convert a small molecule of mercaptan into other sulfides for its removal, which may be conducted by means of prehydrogenation in a conventional alkali-free deodorization process and Prime-G+ process, where a condition for the alkali-free deodorization process may be: an operating pressure of a reactor is 0.2-1.0 MPa, a reaction temperature is 20-60° C., a feeding space velocity is 0.5-2.0 $h^{-1}$, a volume ratio of an air flow to a feeding flow is 0.2-1.0, the catalyst and the cocatalyst used may be a common catalyst in the art.

In the present invention, the adsorption desulfurization is conducted using a desulfurization adsorbent, the desulfurization adsorbent is obtained by loading an active metal component onto a composite carrier made of zeolite and active carbon which are subjected to alkali treatment respectively, wherein, the active metal is selected from one or more elements of IA, VIII, IB, IIB and VIB groups in the periodic table.

In the composite carrier of the present invention, the zeolite and the active carbon have a mass ratio of (20-80):(80-20), preferably (20-60):(80-40).

Furthermore, the zeolite is an X type, a Y type or a ZSM-5 typezeolite. The present invention does not strictly limit the zeolite adopting the X type and the ZSM-5 type; a ratio of silicon atoms to aluminum atoms in skeleton of the Y type zeolite is no less than 3.0 (as measured by an XRD method). In addition, the present invention does not strictly limit the active carbon used, and a specific surface area thereof may be about 1000 $m^2/g$ generally.

In the present invention, the active metal selected from IA group in the periodic table is, for instance, potassium (K), sodium (Na), etc.; the active metal selected from VIII group in the periodic table is, for instance, iron (Fe), cobalt (Co), nickel (Ni), etc.; the active metal selected from IB group in the periodic table is, for instance, copper (Cu), silver (Ag), etc.; the active metal selected from IIB group in the periodic table is, for instance, zinc (Zn), etc.; the active metal selected from VIB group in the periodic table is, for instance, molybdenum (Mo), etc.

Furthermore, the active metal is selected from at least two of Ni, Fe, Ag, Co, Mo, Zn and K, in which, Ni may have a loading of 10-30% on the composite carrier; Fe may have a loading of 5-15% on the composite carrier; Ag may have a loading of 5-10% on the composite carrier; Co may have a loading of 5-10% on the composite carrier; Mo may have a loading of 5-10% on the composite carrier; Zn may have a loading of 5-15% on the composite carrier; K may have a loading of 5-15% on the composite carrier. The loading is a loading of each active metal on the composite carrier respectively.

Furthermore, the active metal has a loading of 2-30% on the composite carrier, preferably 5-25%, more preferably 5-20%. When more than two active metals are loaded on the composite carrier, the loading is an overall loading of the active metals.

In an embodiment, the active metal is K and Ni; furthermore, K has a loading of 5-15% on the composite carrier, Ni has a loading of 10-25% on the composite carrier; furthermore, K and Ni which are loaded on the composite carrier have a mass ratio of (0.2-0.5):1.

In another embodiment, the active metal is Zn and Fe; furthermore, Zn has a loading of 5-15% on the composite carrier, Fe has a loading of 8-15% on the composite carrier; furthermore, Zn and Fe which are loaded on the composite carrier have a mass ratio of (0.5-1):1.

In an embodiment, the light gasoline fraction may be mixed with the desulfurized medium gasoline fraction and the desulfurized heavy gasoline fraction after being subjected to adsorption desulfurization to obtain the desulfurized gasoline. Moreover, the light gasoline fraction may be subjected to the adsorption desulfurization using any one of the desulfurization adsorbent described above.

In another embodiment, the demercaptan light gasoline fraction may be mixed with the desulfurized medium gasoline fraction and the desulfurized heavy gasoline fraction after being subject to adsorption desulfurization to obtain the desulfurized gasoline. Moreover, the demercaptan light gasoline fraction may be subjected to the adsorption desulfurization using any one of the desulfurization adsorbent described above.

The method for preparing the above desulfurization adsorbent may include steps of:

preparing a composite carrier made of the zeolite and the active carbon in proportion which are respectively treated with alkali;

impregnating the composite carrier with a soluble salt solution of the active metal, and drying the impregnated material for calcination to obtain the desulfurization adsorbent.

In an embodiment, the alkali treatment includes mixing the zeolite and the active carbon respectively in a proportion where a mass ratio of the zeolite or the active carbon to alkali to water is (0.1-2):(0.05-2):(4-15), and stirring the mixture for 0.1-24 h in a condition where the temperature is maintained at 0-120° C., then drying, and including at least one time of the alkali treatment process.

The present invention does not strictly limit the alkali used in the alkali treatment, for instance, a NaOH solution at 0.1-1.0 mol/L may be used. Furthermore, a temperature of the stirring treatment may be 30-100° C., and the time may be 1-10 h; furthermore, a temperature of the stirring treatment may be 70-80° C., and the time may be 2-4 h. A temperature of the drying after the stirring treatment may be, for instance, 100-120° C., and the time may be, for instance, 5-8 h. The alkali treatment process may be one time or two times.

In the present invention, a soluble salt solution of the active metal may be, for instance, a sulfate solution, a nitrate solution, etc., preferably the sulfate solution. The impregnation may be an incipient wetness impregnation which is a conventional impregnation method in the art, a specific operation thereof may be, for instance: at an room temperature and in a stirring condition, instilling a soluble salt solution of the active metal into the composite carrier until the composite carrier is aggregated to a ball, and then standing for a period of time (for instance, 1-3 h). Especially, when two active metal components are loaded on the composite carrier, firstly a soluble salt solution of the first active metal is loaded by incipient wetness impregnation, upon washing, drying and calcinating, then a soluble salt solution of the second active metal is loaded by incipient wetness impregnation, upon washing, drying and calcinating, a composite carrier loading two active metal components may be prepared.

During the impregnation, the amount of soluble salt of the active metals needed for the impregnation may be calculated according to a requirement for the loading of the active metals on the composite carrier respectively and a requirement for the overall loading (loading more than two active metal components) of the active metals on the composite carrier.

Furthermore, the drying for the impregnated material is conducted for 12-24 h at a temperature of between 90-120° C., preferably for 18-24 h at a temperature of between 110-120° C. The impregnated material is subjected to calcinations for 4-6 h at a temperature of between 450-640° C. after being dried.

Furthermore, the impregnated material being subjected to calcinations after being dried includes cooling the dried material down to a room temperature, elevating the temperature to 400° C. at a speed of 6° C./min firstly, and then elevating the temperature to 450-640° C. at a speed of 3° C./min.

In the present invention, the adsorption desulfurization is conducted using a fixed bed at an atmospheric pressure, and a temperature of the adsorption desulfurization is controlled between 20-100° C., for instance, 30-80° C., a flow rate of the medium gasoline fraction or the light gasoline fraction is 0.3-1 mL/min, for instance, 0.5 mL/min.

The method for deep desulfurization of gasoline according to the present invention may further include:

washing the desulfurization adsorbent which has been subject to the adsorption desulfurization with a steam to collect a sulfur-rich component;

the sulfur-rich component and the heavy gasoline fraction being subjected to the selective hydrodesulfurization after mixing them together.

Furthermore, the method for deep desulfurization of gasoline also includes:

after washing the desulfurization adsorbent which has been subjected to the adsorption desulfurization with the steam, drying the washed desulfurization adsorbent with nitrogen at a temperature of 200-400° C., and cooling the dried desulfurization adsorbent with nitrogen to realize regeneration of the desulfurization adsorbent.

That is, the method for regeneration of the desulfurization adsorbent includes washing the desulfurization adsorbent to be regenerated with steam, drying the same with nitrogen at a temperature of 200-400° C. and cooling the same with nitrogen in sequence.

Specifically, steam at a temperature of 130-180° C. may be used to sweep the desulfurization adsorbent which is subjected to the adsorption desulfurization for 1-3 h for washing, then nitrogen at a temperature of 200-400° C. is used to sweep a same for 10-60 min for drying, and finally nitrogen at a room temperature is used to sweep the same for 10-60 min for cooling.

In the method for deep desulfurization of gasoline of the present invention, the heavy gasoline fraction and hydrogen are subjected to the selective hydrodesulfurization in the presence of a selective hydrodesulfurization catalyst to obtain desulfurized heavy gasoline fraction, wherein, a temperature of the selective hydrodesulfurization is 200-300° C., a pressure thereof is 1.5-2.5 MPa, a liquid hourly space velocity (the heavy gasoline fraction) is 1-5 $h^{-1}$, a volume ratio of hydrogen to oil is 400-600.

The selective hydrodesulfurization catalyst described in the present invention may be a conventional catalyst subjecting gasoline to selective hydrodesulfurization in the prior art, such as a catalyst of RSDS-I, RSDS-21, RSDS-22 in the RSDS process, a catalyst of HR806 and HR841 in the Prime-G+ process, a combined catalyst of FGH-20/FGH-11 in the OCT-M process, an HDOS series deep hydrodesulfurization catalyst in the CDOS process, etc.

In an embodiment, the hydrodesulfurization catalyst is obtained by a carrier loading an active metal component, where, the carrier is a zeolite (such as the X type, the Y type or the ZSM-5 type) or a metal oxide (such as aluminium oxide), and the active metal includes Co and Mo. Furthermore, Co and Mo have an overall loading of 5-20% on the carrier. Furthermore, Co and Mo which are loaded on the carrier have a mass ratio of (0.2-0.6):1.

Implementations of the present invention have at least the following advantages:

1. The method for deep desulfurization in the present invention, after a gasoline feedstock has been subjected to demercaptan treatment, the gasoline feedstock is cut into light, medium and heavy gasoline fractions, which are processed respectively according to features of the respective gasoline fractions. This method not only helps to reduce regeneration times of the desulfurization adsorbent, but also helps to reduce component content of hydrodesulfurization; this method can realize deep desulfurization of the gasoline feedstock, and meanwhile there is no loss of octane number.

2. The method for deep desulfurization in the present invention may use a specific desulfurization adsorbent, which not only has a large sulfur capacity and good selectivity for sulfur, but also the desulfurization is highly deep, and sulfur may be desulfurized to 1 ppmw (part per million by weight); in addition, it has a long lifespan and relatively environment-friendly.

3. The method for deep desulfurization in the present invention, after adsorption desulfurization, the desulfurization adsorbent may be washed, a sulfur-rich component formed by the washing may be mixed with heavy gasoline fraction for selective hydrodesulfurization, thereby avoiding a waste of feedstock and improving utilization of the feedstock; meanwhile, regeneration of the desulfurization adsorbent may be realized by conducting a drying and cooling process subsequent to the washing, this way is simple and easy to operate, and the regenerated desulfurization adsorbent does not need hydrogen reduction prior to use, which is environment-friendly and economical; moreover, the desulfurization adsorbent may be regenerated many times, which can still maintain a relatively high sulfur capacity and an excellent desulfurization effect after the regeneration.

4. The method for deep desulfurization in the present invention, when gasoline is subjected to desulfurization, an operating condition is mild and operations are flexible for the process, which may conducted at an atmospheric pressure and a relatively low temperature, thus energy consumption is saved and operational costs are reduced.

DETAILED DESCRIPTION

In order to make objectives, technical solutions, and advantages of the present invention clearer, the technical solutions in embodiments of the present invention are hereinafter described clearly and completely with reference to the embodiments of the present invention. Obviously, the described embodiments are only a part of embodiments of the present invention, rather than all embodiments of the present invention. All other embodiments obtained by those skilled in the art based on embodiments of the present invention without any creative efforts shall fall within the protection scope of the present invention.

Embodiment 1

1. Prepare a Desulfurization Adsorbent
1) Prepare a Zeolite and an Active Carbon Subjected to Alkali Treatment After elevating temperatures of two 500 mL of NaOH solutions at a concentration of 0.3 mol/L to about 70° C. by a water bath, adding 25 g of ZSM-5 type zeolite and 25 g of active carbons therein respectively, immediately lowering a temperature of the mixture to room temperature by an ice bath after stirring for about 200 minutes, filtering the mixture, filtering and washing filter cake with deionized water several times till pH value of the filtrate is about 7, placing the obtained filter cake into an oven at a temperature of 110° C. to be dried for 4 h, and thus preparing a ZSM-5 zeolite subjected to alkali treatment and an active carbon subjected to alkali treatment respectively, wherein, curves of absorption and desorption isotherms and pore diameter distribution of the ZSM-5 zeolite before and after alkali treatment can be seen from FIG. 1 and FIG. 2 respectively.

In addition, an ASAP2000 type automatically physical adsorption instrument is used to measure specific surface areas and pore diameter distributions of the ZSM-5 zeolite and the active carbon, and results are as shown in Table 1.

TABLE 1

| Carrier | Total specific surface area $S_{BET}/(m^2 \cdot g^{-1})$ | Total pore volume $V/(cm^3 \cdot g^{-1})$ | Medium pore volume $V_{meso}/(cm^3 \cdot g^{-1})$ | Average pore diameter $d/(nm)$ |
|---|---|---|---|---|
| ZSM-5 zeolite before alkali treatment | 380 | 0.212 | 0.041 | 2.241 |
| ZSM-5 zeolite after alkali treatment | 427 | 0.430 | 0.300 | 4.031 |
| Active carbon before alkali treatment | 1190 | 0.701 | 0.326 | 2.321 |
| Active carbon after alkali treatment | 1254 | 0.742 | 0.358 | 2.427 |

Figure 1:
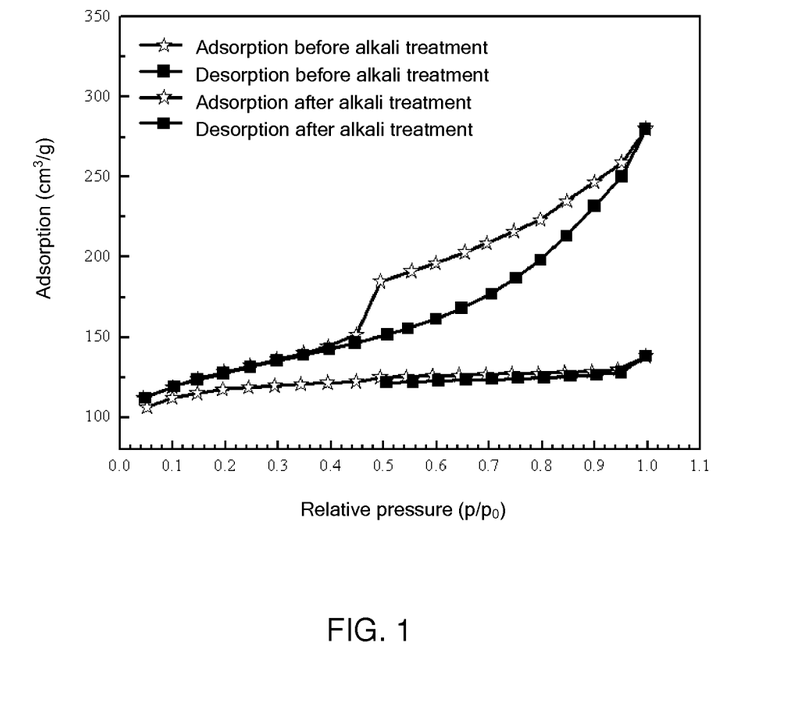
FIG. 1 is a curve of absorption and desorption isotherms of a ZSM-5 zeolite before and after alkali treatment according to Embodiment 1.

It can be seen from FIG. 1 that: the ZSM-5 zeolite before alkali treatment exhibits an I-type isotherm which is characterized by micropore properties, the desorption isotherm thereof is almost overlapped with the adsorption isotherm; whereas the ZSM-5 zeolite after alkali treatment exhibits an IV-type isotherm with obvious characteristics, which presents a continuous adsorption state till a saturation pressure within the entire measured pressure range, and which conducts desorption gradually with decrease in pressure during the desorption firstly, when the pressure reaches a certain value, the desorption amount surges suddenly to form a relatively steep curve, and then it overlapped with the adsorption isotherm as pressure further decreases, thus it indicates that a great number of mesopores (medium pores) are generated in the ZSM-5 zeolite after alkali treatment.

Figure 2:
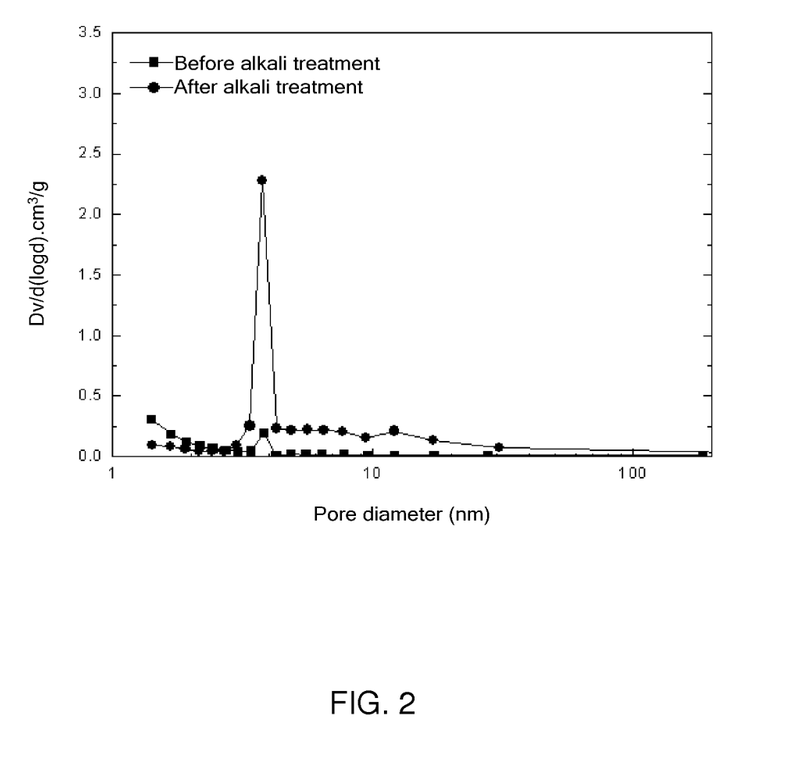
FIG. 2 is a curve of pore diameter distribution of a ZSM-5 zeolite before and after alkali treatment according to Embodiment 1.

It can be seen from FIG. 2 that, the ZSM-5 zeolite before alkali treatment is mainly micropores, there is a wide distribution before 2 nm and a small peak at a position of 3.5 nm, and substantially no pores after 4 nm, an obtained average pore diameter calculated using a t-plot method is about 2.3 nm; there is still a distribution of a part of micropores before 2 nm for the ZSM-5 zeolite after alkali treatment, and a strong peak at a position of about 3.8 nm, the peak height is almost about 11 times the height of the ZSM-5 zeolite before alkali treatment, and there is also a relative wide distribution of pores after 4 nm Meanwhile, results of Table 1 indicate that: a medium pore volume and an average pore diameter of the ZSM-5 zeolite subjected to alkali treatment are increased significantly, which indicates that a large number of micropores are converted into medium pores, thereby forming a composite pore structure of a mesopore and a micropore; the total specific surface area, the total pore volume, the medium pore volume and the average pore diameter of the active carbon subjected to alkali treatment are all increased.

2) Prepare a Composite Carrier

Placing the ZSM-5 zeolite subjected to alkali treatment and the active carbon subjected to alkali treatment in a mortar to be ground into powders after mixing them at a mass ratio of 40:60, then placing the mixture in an oven at a temperature of 120° C. to be dried for 6 h, thereby preparing a composite carrier.

3) Prepare a Desulfurization Adsorbent

The composite carrier obtained above is firstly subjected to incipient wetness impregnation with a $K_2SO_4$ solution, after washing, drying and calcinating, then the composite carrier impregnated with $K_2SO_4$ is subjected to incipient wetness impregnation with $NiSO_4$, and after washing, drying and calcinating, a desulfurization adsorbent is prepared;

The washing, the drying and the calcinating described above are specifically: after washing the impregnated material with deionized water, drying it for 20 hours at a temperature of 120° C., after cooling the dried material down to room temperature, elevating the temperature to 400° C. at a speed of 6° C./min firstly, and then elevating the temperature to 550° C. at a speed of 3° C./min, conducting calcinations for 4 hours at the temperature of 550° C.

In the desulfurization adsorbent prepared above, K has a loading of about 5% on the composite carrier, Ni has a loading of about 10% on the composite carrier; moreover, K and Ni which are loaded on the composite carrier have a mass ratio of 0.5:1. Upon detection, a sulfur capacity of the desulfurization adsorbent is 0.514, and its lifespan lasts for 8-9 h.

In the present invention, a sulfur capacity is a total sulfur content (by gram) desulfurized when 1 g desulfurization adsorbent reduces the total sulfur content in the gasoline feedstock below 10 ppmw, for instance, when the sulfur capacity is 0.514, it indicates that the total sulfur content desulfurized is 0.514 g on 1 g of desulfurization adsorbent to reduce the total sulfur content in the gasoline feedstock below 10 ppmw.

2. Prepare a Selective Hydrodesulfurization Catalyst

A ZSM-5 zeolite (carrier) is firstly subjected to incipient wetness impregnation with a $CoSO_4$ solution, after washing, drying and calcinating, then the ZSM-5 zeolite impregnated with the $CoSO_4$ solution is subjected to incipient wetness impregnation with an aqueous solution of $(NH_4)_6Mo_7O_{24}\cdot 4H_2O$, and after washing, drying and calcinating, a selective hydrodesulfurization catalyst is prepared, wherein, a specific operation of the washing, the drying and the calcinating refer to step 1.

A total specific surface area of the selective hydrodesulfurization catalyst prepared above is about 356 $m^2/g$, a total pore volume is about 0.315 $cm^3 \cdot g^{-1}$, Co has a loading of about 4% on the carrier, Mo has a loading of about 10% on the carrier; moreover, Co and Mo which are loaded on the carrier have a mass ratio of 0.4:1.

3. Gasoline Desulfurization

Figure 3:
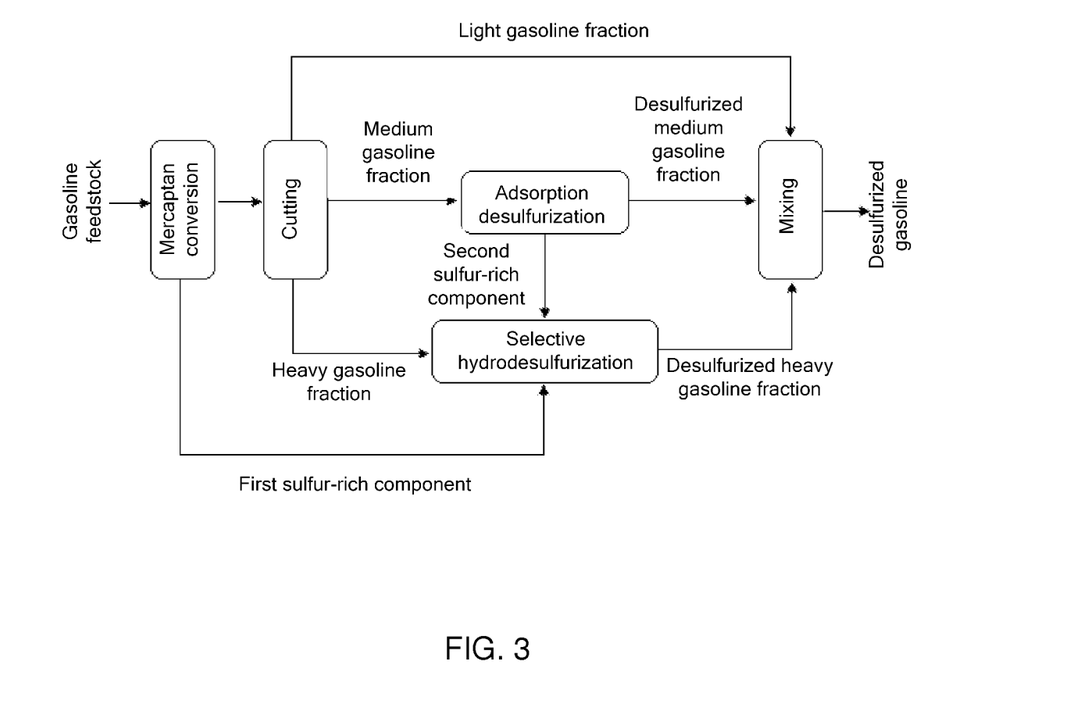
FIG. 3 is a process flow chart of a method for deep desulfurization of gasoline according to Embodiment 1.

Fluid catalytic cracking gasoline which is produced from Daqing atmospheric heavy oil subjected to catalytic cracking is taken as a feedstock (see Table 2 for its composition), and a process flow of desulfurization of the gasoline feedstock can be seen from FIG. 3.

Firstly, a mercaptan conversion method (an alkali-free deodorization process) is used to conduct a demercaptan treatment for the gasoline feedstock, where an operating pressure of the reactor may be controlled at about 0.5 MPa, a reacting temperature is about 40° C., a feeding space velocity is 1.0 $h^{-1}$ and a volume ratio of an air flow to a feeding flow is about 0.5, the demercaptan gasoline and a first sulfur-rich component are collected, and the first sulfur-rich component is incorporated into heavy gasoline fraction to proceed with a next step.

The demercaptan gasoline is cut into light, medium and heavy gasoline fractions, where a cutting temperature of the light and the medium gasoline fractions is 60° C., and a cutting temperature of the medium and the heavy gasoline fractions is 100° C.

Filling the desulfurization adsorbent prepared above into a fixed bed reactor, at a temperature of 30° C. and in a condition of atmospheric pressure, the medium gasoline fraction being subjected to adsorption desulfurization at a flow rate of 0.5 mL/min to obtain a desulfurized medium gasoline fraction; in addition, after the adsorption desulfurization, sweeping the desulfurization adsorbent which is subjected to the adsorption desulfurization with steam at a temperature of 150° C. for 3 h for washing, collecting a second sulfur-rich component, incorporating the second sulfur-rich component into the heavy gasoline fraction to proceed with a next step. Moreover, sweeping the washed desulfurization adsorbent with nitrogen at a temperature of 300° C. for 30 min for drying, and sweeping the dried desulfurization adsorbent with nitrogen at a room temperature (30° C.) for 30 min for cooling, so that the desulfurization adsorbent is regenerated, a sulfur capacity of the desulfurization adsorbent which has been regenerated three times is 0.473, and its lifespan lasts for about 7 h.

Filling the selective hydrodesulfurization catalyst prepared above into the fixed bed reactor, the heavy gasoline fraction which is incorporated with the first sulfur-rich component and the second sulfur-rich component are subjected to selective hydrodesulfurization in a condition where a reacting temperature is 260° C., a reacting pressure is 1.8 MPa, a liquid hourly space velocity is 3.0 $h^{-1}$, and a volume ratio of hydrogen to oil is 500, thereby obtaining a desulfurized heavy gasoline fraction. Mixing the desulfurized heavy gasoline fraction with the light gasoline fraction and the desulfurized medium gasoline fraction to prepare desulfurized gasoline, and the composition thereof see Table 2.

Embodiment 2

Figure 4:
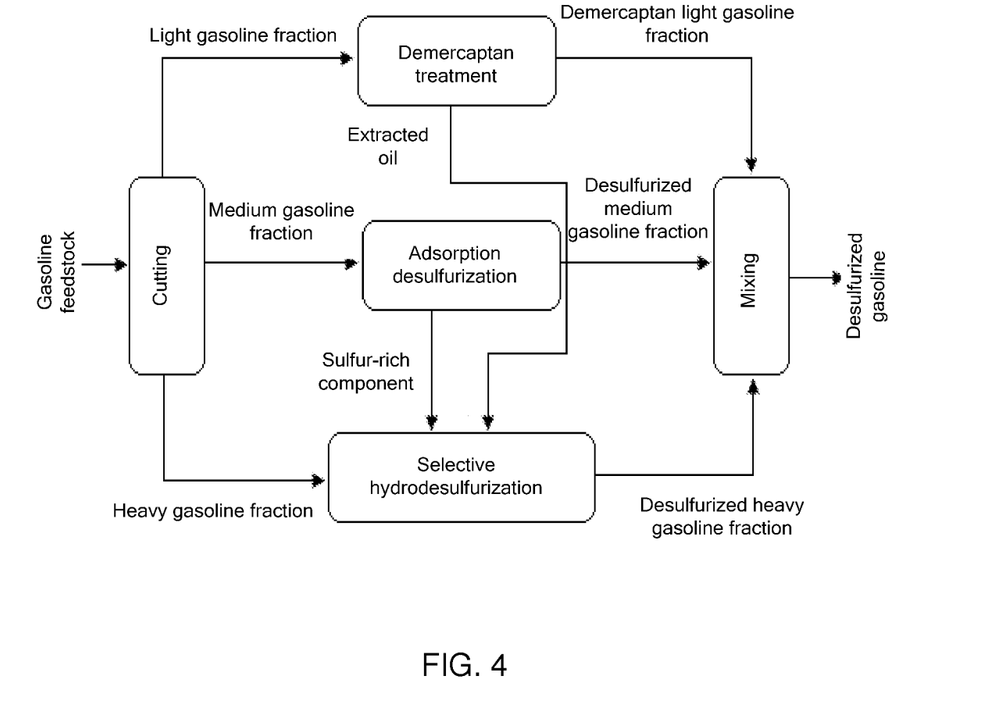
FIG. 4 is a process flow chart of a method for deep desulfurization of gasoline according to Embodiment 2.

Fluid catalytic cracking gasoline which is produced from Daqing atmospheric heavy oil subjected to catalytic cracking according to Embodiment 1 is taken as a feedstock, and a process flow of desulfurization of the gasoline feedstock can be seen from FIG. 4.

Firstly, cutting the gasoline feedstock into light, medium and heavy gasoline fractions, where a cutting temperature of the light and the medium gasoline fractions is 60° C., and a cutting temperature of the medium and the heavy gasoline fractions is 100° C.

The light gasoline fraction is enabled to be in contact with alkali solution for demercaptan treatment in an extraction system, where the alkali used is a NaOH solution in a mass content of 20%, a volume ratio of the light gasoline fraction to the NaOH solution is 5:1, an operating temperature is 30° C., the demercaptan light gasoline fraction and extracted oil are collected, and the extracted oil is incorporated into the heavy gasoline fraction to proceed with a next step.

Filling the desulfurization adsorbent prepared in Embodiment 1 into a fixed bed reactor, at a temperature of 30° C. and in a condition of atmospheric pressure, the medium gasoline fraction being subjected to adsorption desulfurization at a flow rate of 0.5 mL/min to obtain a desulfurized medium gasoline fraction; in addition, after the adsorption desulfurization, sweeping the desulfurization adsorbent which is subjected to the adsorption desulfurization with steam at a temperature of 150° C. for 3 h for washing, collecting a sulfur-rich component, incorporating the sulfur-rich component into the heavy gasoline fraction to proceed with a next step.

Filling the selective hydrodesulfurization catalyst prepared in Embodiment 1 into the fixed bed reactor, the heavy gasoline fraction which is incorporated with extracted oil and the sulfur-rich component are subjected to selective hydrodesulfurization in a condition where a reacting temperature is 260° C., a reacting pressure is 1.8 MPa, a liquid hourly space velocity is 3.0 $h^{-1}$, and a volume ratio of hydrogen to oil is 500, thereby obtaining a desulfurized heavy gasoline fraction. Mixing the desulfurized heavy gasoline fraction with the demercaptan light gasoline fraction and the desulfurized medium gasoline fraction to prepare desulfurized gasoline, and the composition thereof see Table 2.

TABLE 2

Composition of Gasoline before and after Desulfurization

| Items | | Gasoline feedstock | Desulfurized gasoline in Embodiment 1 | Desulfurized gasoline in Embodiment 2 |
|---|---|---|---|---|
| Density (20° C.), g/cm³ | | 0.7012 | 0.7280 | 0.7236 |
| Sulfur content, ppmw | | 282 | 10 | 10 |
| Group composition, m % | Paraffin | 35.0 | 46.8 | 45.7 |
| | Olefin | 48.2 | 23.8 | 24.0 |
| | Naphthene | 6.3 | 12.1 | 12.4 |
| | Aromatics | 10.5 | 17.3 | 17.9 |
| Octane number | RON | 90.2 | 89.6 | 89.6 |
| | MON | 80.9 | 80.5 | 80.5 |

It can be seen from Table 2 that:

The method for deep desulfurization of gasoline as described in Embodiment 1 and Embodiment 2 of the present invention not only can reduce sulfur content in the gasoline feedstock to below 10 ppm, but also can control olefin content below 24%, and loss of octane number is only 0.6.

Embodiment 3

1. Prepare Desulfurization Adsorbent

1) Prepare a Zeolite and an Active Carbon Subjected to Alkali Treatment

After elevating temperatures of two 500 mL of NaOH solutions at a concentration of 0.2 mol/L to about 80° C. by a water bath, adding 25 g of Y type zeolite and 25 g of active carbons therein respectively, immediately lowering a temperature of the mixture to room temperature by an ice bath after stirring for about 120 minutes, filtering the mixture, filtering and washing a filter cake with deionized water several times till pH value of the filtrate is about 7, placing the filter cake obtained into an oven at a temperature of 120° C. to be dried for 3 h, and thus preparing an Y type zeolite subjected to alkali treatment and an active carbon subjected to alkali treatment respectively; specific surface areas and pore diameter distributions of the Y type zeolite and the active carbon are as shown in Table 3.

TABLE 3

Specific Surface Areas and Pore Diameters of Y Type Zeolite and Active Carbon

| Carrier | Total specific surface area $S_{BET}/(m^2 \cdot g^{-1})$ | Total pore volume V/ $(cm^3 \cdot g^{-1})$ | Medium pore volume $V_{meso}/$ $(cm^3 \cdot g^{-1})$ | Average pore diameter d/(nm) |
|---|---|---|---|---|
| Y type zeolite before alkali treatment | 706 | 0.390 | 0.053 | 2.001 |
| Y type zeolite after alkali treatment | 713 | 0.462 | 0.118 | 2.139 |
| Active carbon before alkali treatment | 1190 | 0.701 | 0.326 | 2.321 |
| Active carbon after alkali treatment | 1233 | 0.729 | 0.355 | 2.346 |

2) Prepare a Composite Carrier

Placing the Y type zeolite subjected to alkali treatment and the active carbon subjected to alkali treatment in a mortar to be ground into powders after mixing them at a mass ratio of 20:80, then placing the mixture in an oven at a temperature of 110° C. to be dried for 6 h, thereby preparing a composite carrier.

3) Prepare a Desulfurization Adsorbent

The composite carrier obtained above is firstly subjected to incipient wetness impregnation with a $ZnSO_4$ solution, after washing, drying and calcinating, then the composite carrier impregnated with the $ZnSO_4$ solution is subjected to incipient wetness impregnation with $Fe_2(SO_4)_3$, thereby preparing a desulfurization adsorbent after washing, drying and calcinating;

The washing, the drying and the calcinating described above are specifically: after washing the impregnated material with deionized water, drying it for 24 hours at a temperature of 110° C., after cooling the dried material down to a room temperature, elevating the temperature to 400° C. at a speed of 6° C./min firstly, and then elevating the temperature to 450° C. at a speed of 3° C./min, conducting calcination for 6 hours at a temperature of 450° C.

In the desulfurization adsorbent prepared above, Zn has a loading of about 10% on the composite carrier, Fe has a loading of about 10% on the composite carrier; moreover, Zn and Fe which are loaded on the composite carrier have a mass ratio of 1:1. Upon detection, a sulfur capacity of the desulfurization adsorbent is 0.481, and its lifespan lasts for 7-8 h.

2. Prepare a Selective Hydrodesulfurization Catalyst

Preparing a selective hydrodesulfurization catalyst according to the method described in Embodiment 1, whereas the difference lies in controlling Co to have a loading of about 6% on the carrier, and controlling Mo to have a loading of about 10% on the carrier; moreover, Co and Mo which are loaded on the carrier have a mass ratio of 0.6:1.

3. Gasoline Desulfurization

Figure 5:
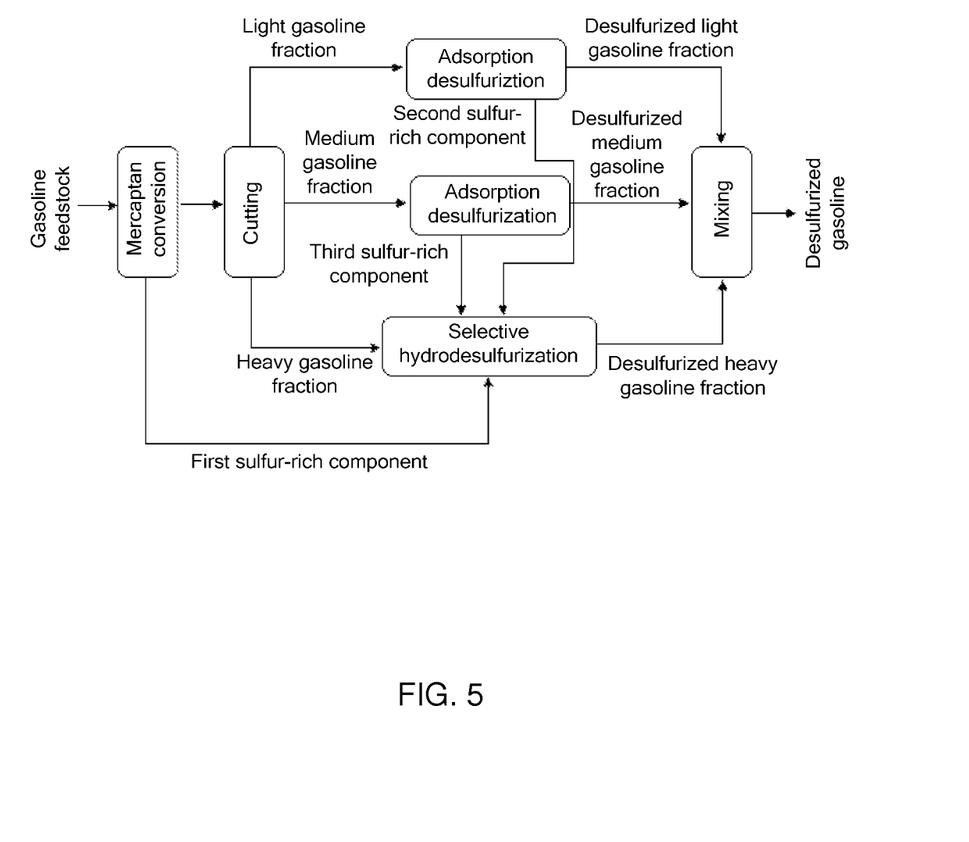
FIG. 5 is a process flow chart of a method for deep desulfurization of gasoline according to Embodiment 3.

Fluid catalytic cracking gasoline from Daqing is taken as a feedstock (the composition thereof see Table 4), and a process flow of desulfurization of the gasoline feedstock as shown in FIG. 5.

Firstly, a mercaptan conversion method (an alkali-free deodorization process) is used to conduct demercaptan treatment for the gasoline feedstock, where an operating pressure of the reactor may be controlled at about 0.3 MPa, a reacting temperature is about 60° C., a feeding space velocity is 1.5 $h^{-1}$ and a volume ratio of an air flow to a feeding flow is about 1.0, the demercaptan gasoline and a first sulfur-rich component are collected, and the first sulfur-rich component is incorporated into the heavy gasoline fraction to proceed with a next step.

The demercaptan gasoline is cut into light, medium and heavy gasoline fractions, where a cutting temperature of the light and the medium gasoline fractions is 50° C., and a cutting temperature of the medium and the heavy gasoline fractions is 90° C.

Filling the desulfurization adsorbent prepared above into a fixed bed reactor, at a temperature of 30° C. and in a condition of atmospheric pressure, the light gasoline fraction being subjected to adsorption desulfurization at a flow rate of 0.3 mL/min to obtain a desulfurized light gasoline fraction; in addition, after the adsorption desulfurization, sweeping the desulfurization adsorbent which is subjected to the adsorption desulfurization with steam at a temperature of 180° C. for 1 h for washing, collecting a second sulfur-rich component, incorporating the second sulfur-rich component into the heavy gasoline fraction to proceed with a next step. Moreover, sweeping the washed desulfurization adsorbent with nitrogen at a temperature of 400° C. for 10 min for drying, and sweeping the dried desulfurization adsorbent with nitrogen at room temperature (10° C.) for 10 min for cooling, so that the desulfurization adsorbent is regenerated.

At a temperature of 30° C. and in a condition of atmospheric pressure, the medium gasoline fraction being subjected to adsorption desulfurization at a flow rate of 0.3 mL/min to obtain a desulfurized medium gasoline fraction; in addition, after the adsorption desulfurization, sweeping the desulfurization adsorbent which is subjected to the adsorption desulfurization with steam at a temperature of 180° C. for 1 h for washing, collecting a third sulfur-rich component, incorporating the third sulfur-rich component into the heavy gasoline fraction to proceed with a next step. Moreover, sweeping the washed desulfurization adsorbent with nitrogen at a temperature of 400° C. for 10 min for drying, and sweeping the dried desulfurization adsorbent with nitrogen at room temperature (10° C.) for 10 min for cooling, so that the desulfurization adsorbent is regenerated, a sulfur capacity of the desulfurization adsorbent which has been regenerated three times is 0.481, and its lifespan lasts for about 7 h.

Filling the selective hydrodesulfurization catalyst prepared above into the fixed bed reactor, the heavy gasoline fraction which is incorporated with the first, the second and the second sulfur-rich components are subjected to selective hydrodesulfurization in a condition where a reacting temperature is 300° C., a reacting pressure is 1.5 MPa, a liquid hourly space velocity is 4.0 $h^{-1}$, and a volume ratio of hydrogen to oil is 600, thereby obtaining a desulfurized heavy gasoline fraction. Mixing the desulfurized heavy gasoline fraction with the desulfurized light gasoline fraction and the desulfurized medium gasoline fraction to prepare desulfurized gasoline, and the composition thereof see Table 4.

Embodiment 4

Figure 6:
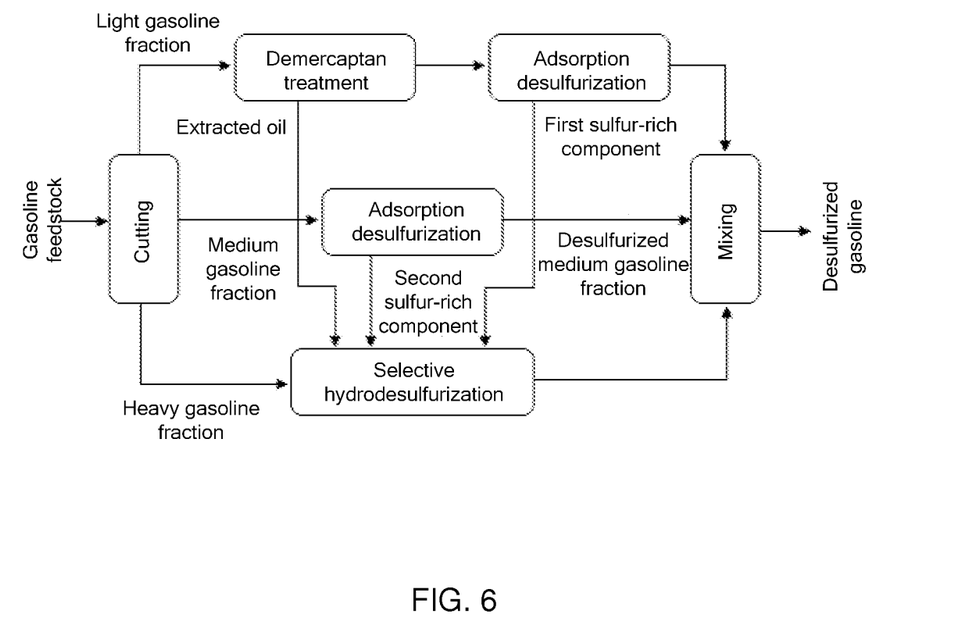
FIG. 6 is a process flow chart of a method for deep desulfurization of gasoline according to Embodiment 4.

Fluid catalytic cracking gasoline from Daqing in Embodiment 3 is taken as a feedstock, and a process flow of desulfurization of the gasoline feedstock as can be seen from FIG. 6.

Firstly, cutting the gasoline feedstock into light, medium and heavy gasoline fractions, where a cutting temperature of the light and the medium gasoline fractions is 50° C., and a cutting temperature of the medium and the heavy gasoline fractions is 90° C.

The light gasoline fractions are enabled to be in contact with alkali solution for demercaptan treatment in an extraction system, where the alkali used is NaOH solution in a mass content of 10%, and a volume ratio of the light gasoline fraction to NaOH solution is 5:1, an operating temperature is 45° C., the demercaptan light gasoline fraction and extracted oil are collected, and the extracted oil is incorporated into the heavy gasoline fraction to proceed with a next step.

Filling the desulfurization adsorbent prepared in Embodiment 3 into a fixed bed reactor, at a temperature of 30° C. and in a condition of atmospheric pressure, the demercaptan light gasoline fraction being subjected to adsorption desulfurization at a flow rate of 0.3 mL/min to obtain a desulfurized light gasoline fraction; in addition, after the adsorption desulfurization, sweeping the desulfurization adsorbent which is subjected to the adsorption desulfurization with steam at a temperature of 180° C. for 1 h for washing, collecting a first sulfur-rich component, incorporating the first sulfur-rich component into the heavy gasoline fraction to proceed with a next step.

At a temperature of 30° C. and in a condition of atmospheric pressure, the medium gasoline fraction being subjected to adsorption desulfurization at a flow rate of 0.3 mL/min to obtain a desulfurized medium gasoline fraction; in addition, after the adsorption desulfurization, sweeping the desulfurization adsorbent which is subjected to the adsorption desulfurization with steam at a temperature of 180° C. for 1 h for washing, collecting a second sulfur-rich component, incorporating the second sulfur-rich component into the heavy gasoline fraction to proceed with a next step.

Filling the selective hydrodesulfurization catalyst prepared in Embodiment 3 into the fixed bed reactor, the heavy gasoline fraction which is incorporated with extracted oil, the first and the second sulfur-rich components are subjected to selective hydrodesulfurization in a condition where a reacting temperature is 300° C., a reacting pressure is 1.5 MPa, a liquid hourly space velocity is 4.0 $h^{-1}$, and a volume ratio of hydrogen to oil is 600, thereby obtaining a desulfurized heavy gasoline fraction. Mixing the desulfurized heavy gasoline fraction with the desulfurized light gasoline fraction and the desulfurized medium gasoline fraction to prepare the desulfurized gasoline, and the composition thereof see Table 4.

TABLE 4

Composition of Gasoline before and after Desulfurization

| Items | | Gasoline feedstock | Desulfurized gasoline in Embodiment 3 | Desulfurized gasoline in Embodiment 4 |
|---|---|---|---|---|
| Density (20° C.), g/cm³ | | 0.7012 | 0.7202 | 0.7216 |
| Sulfur content, ppmw | | 282 | 10 | 10 |
| Group composition, m % | Paraffin | 35.0 | 46.2 | 47.1 |
| | Olefin | 48.2 | 23.3 | 23.6 |
| | Naphthene | 6.3 | 12.6 | 11.9 |
| | Aromatics | 10.5 | 17.9 | 17.4 |

TABLE 4-continued

Composition of Gasoline before and after Desulfurization

| Items | | Gasoline feedstock | Desulfurized gasoline in Embodiment 3 | Desulfurized gasoline in Embodiment 4 |
|---|---|---|---|---|
| Octane number | RON | 90.2 | 89.5 | 89.4 |
|  | MON | 80.9 | 80.2 | 80.0 |

It can be seen from Table 4 that:

The method for deep desulfurization of gasoline as described in Embodiment 3 and Embodiment 4 of the present invention not only can reduce sulfur content in the gasoline feedstock to below 10 ppm, but also can control olefin content below 24%, and loss of octane number is only 0.7.

Embodiment 5

1. Prepare a Desulfurization Adsorbent

1) Prepare a Zeolite and an Active Carbon Subjected to Alkali Treatment

After elevating temperatures of two 500 mL of NaOH solution at a concentration of 0.2 mol/L to about 70° C. by a water bath, adding 25 g of ZSM-5 type zeolite and 25 g of active carbons therein respectively, immediately lowering a temperature of the mixture to room temperature by an ice bath after stirring for about 90 minutes, filtering the mixture, filtering and washing a filter cake with deionized water several times till pH value of the filtrate is about 7, placing the filter cake obtained into an oven at a temperature of 120° C. to be dried for 3 h;

Repeating the above steps one time respectively for the ZSM-5 type zeolite and the active carbon obtained (that is, conducting alkali treatment twice), and thus preparing a ZSM-5 type zeolite subjected to alkali treatment and an active carbon subjected to alkali treatment; specific surface areas and pore diameter distributions of the ZSM-5 type zeolite and the active carbon as shown in Table 5.

TABLE 5

Specific Surface Areas and Pore Diameters of ZSM-5 Type Zeolite and Active Carbon

| Carrier | Total specific surface area $S_{BET}/(m^2 \cdot g^{-1})$ | Total pore volume $V/(cm^3 \cdot g^{-1})$ | Medium pore volume $V_{meso}/(cm^3 \cdot g^{-1})$ | Average pore diameter $d/(nm)$ |
|---|---|---|---|---|
| ZSM-5 before alkali treatment | 380 | 0.212 | 0.041 | 2.241 |
| ZSM-5 after alkali treatment | 432 | 0.433 | 0.302 | 4.030 |
| Active carbon before alkali treatment | 1190 | 0.701 | 0.326 | 2.321 |
| Active carbon after alkali treatment | 1259 | 0.749 | 0.363 | 2.430 |

2) Prepare a Composite Carrier

Placing the ZSM-5 type zeolite subjected to alkali treatment and the active carbon subjected to alkali treatment in a mortar to be ground into powders after mixing them at a mass ratio of 20:80, then placing the mixture in an oven at a temperature of 100° C. to be dried for 8 h, thereby preparing a composite carrier.

3) Prepare a Desulfurization Adsorbent

The composite carrier obtained above is subjected to incipient wetness impregnation with a $ZnSO_4$ solution, after washing, drying and calcinating, then the composite carrier impregnated with the $ZnSO_4$ solution is subjected to incipient wetness impregnation with $Fe_2(SO_4)_3$, and after washing, drying and calcinating, desulfurization adsorbent is prepared;

The washing, the drying and the calcinating described above are specifically: after washing the impregnated material with deionized water, drying it for 20 hours at a temperature of 120° C., after cooling the dried material down to a room temperature, elevating the temperature to 400° C. at a speed of 6° C./min firstly, and then elevating the temperature to 600° C. at a speed of 3° C./min, and conducting calcinations for 6 hours at the temperature of 600° C.

In the desulfurization adsorbent prepared above, Zn has a loading of about 5% on the composite carrier, Fe has a loading of about 10% on the composite carrier; moreover, Zn and Fe which are loaded on the composite carrier have a mass ratio of 0.5:1. Upon detection, a sulfur capacity of the desulfurization adsorbent is 0.49, and its lifespan lasts for about 8 h.

2. Gasoline Desulfurization

Fluid catalytic cracking gasoline from Jinan is taken as a feedstock (the composition thereof see Table 6).

Firstly, a mercaptan conversion method (an alkali-free deodorization process) is used to conduct demercaptan treatment for the gasoline feedstock, where an operating pressure of the reactor may be controlled at about 1 MPa, a reacting temperature is about 30° C., a feeding space velocity is 0.5 $h^{-1}$ and a volume ratio of an air flow to a feeding flow is about 0.2, the demercaptan gasoline and a first sulfur-rich component are collected, and the first sulfur-rich component is incorporated into the heavy gasoline fraction to proceed with a next step.

The demercaptan gasoline is cut into light, medium and heavy gasoline fractions, where a cutting temperature of the light and the medium gasoline fractions is 50° C., and a cutting temperature of the medium and the heavy gasoline fractions is 90° C.

Filling the desulfurization adsorbent prepared above into a fixed bed reactor, at a temperature of 30° C. and in a condition of atmospheric pressure, the medium gasoline fraction being subjected to adsorption desulfurization at a flow rate of 0.8 mL/min to obtain a desulfurized medium gasoline fraction; in addition, after the adsorption desulfurization, sweeping the desulfurization adsorbent which is subjected to the adsorption desulfurization with steam at a temperature of 160° C. for 2 h for washing, collecting a second sulfur-rich component, incorporating the second sulfur-rich component into the heavy gasoline fraction to proceed with a next step. Moreover, sweeping the washed desulfurization adsorbent with nitrogen at a temperature of 300° C. for 45 min for drying, and sweeping the dried desulfurization adsorbent with nitrogen at a room temperature (25° C.) for 45 min for cooling, so that the desulfurization adsorbent is regenerated, a sulfur capacity of the desulfurization adsorbent which has been regenerated three times is 0.457, and its lifespan lasts for about 7 h.

Filling the selective hydrodesulfurization catalyst prepared in Embodiment 1 into the fixed bed reactor, the heavy gasoline fraction which is incorporated with the first sulfur-rich component and the second sulfur-rich component are subjected to selective hydrodesulfurization in a condition where a reacting temperature is 300° C., a reacting pressure is 2.5 MPa, a liquid hourly space velocity is 2.0 $h^{-1}$, and a volume ratio of hydrogen to oil is 400, thereby obtaining a desulfurized heavy gasoline fraction. Mixing the desulfurized heavy gasoline fraction with the light gasoline fraction and the desulfurized medium gasoline fraction to prepare a desulfurized gasoline, and the composition thereof see Table 6.

Embodiment 6

Fluid catalytic cracking gasoline from Jinan in Embodiment 5 is taken as a feedstock.

Firstly, cutting the gasoline feedstock into light, medium and heavy gasoline fractions, where a cutting temperature of the light and the medium gasoline fractions is 50° C., and a cutting temperature of the medium and the heavy gasoline fractions is 90° C.

The light gasoline fraction is enabled to be in contact with alkali solution for demercaptan treatment in an extraction system, where the alkali used is NaOH solution in a mass content of 30%, a volume ratio of the light gasoline fraction to the NaOH solution is 5:1, an operating temperature is 60° C., the demercaptan light gasoline fraction and extracted gasoline are collected, and the extracted gasoline is incorporated into the heavy gasoline fraction to proceed with a next step.

Filling the desulfurization adsorbent prepared in Embodiment 5 into a fixed bed reactor, at a temperature of 30° C. and in a condition of atmospheric pressure, the medium gasoline fraction being subjected to adsorption desulfurization at a flow rate of 0.8 mL/min to obtain a desulfurized medium gasoline fraction; in addition, after the adsorption desulfurization, sweeping the desulfurization adsorbent which is subjected to the adsorption desulfurization with steam at a temperature of 160° C. for 2 h for washing, collecting a first sulfur-rich component, incorporating the first sulfur-rich component into the heavy gasoline fraction to proceed with a next step.

Filling the selective hydrodesulfurization catalyst prepared in Embodiment 2 into the fixed bed reactor, the heavy gasoline fraction which is incorporated with extracted oil and the first sulfur-rich component are subjected to selective hydrodesulfurization in a condition where a reacting temperature is 300° C., a reacting pressure is 2.5 MPa, a liquid hourly space velocity is 2.0 $h^{-1}$, and a volume ratio of hydrogen to oil is 400, thereby obtaining a desulfurized heavy gasoline fraction. Mixing the desulfurized heavy gasoline fraction with the demercaptan light gasoline fraction and the desulfurized medium gasoline fraction to prepare a desulfurized gasoline, and the composition thereof see Table 6.

TABLE 6

Composition of Gasoline before and after Desulfurization

| Items | | Gasoline feedstock | Desulfurized gasoline in Embodiment 5 | Desulfurized gasoline in Embodiment 6 |
|---|---|---|---|---|
| Density (20° C.), g/cm$^3$ | | 0.7562 | 0.7750 | 0.7783 |
| Surfur content, ppmw | | 421 | 10 | 10 |
| Group compostion, m % | Paraffin | 25.6 | 35.7 | 35.8 |
| | Olefin | 30.9 | 13.7 | 13.6 |
| | Naphthene | 8.9 | 13.5 | 14.4 |
| | Aromatics | 34.6 | 37.1 | 36.2 |
| Octane number | RON | 89.2 | 88.7 | 88.4 |
| | MON | 80.1 | 79.6 | 79.5 |

It can be seen from Table 6 that:

The method for deep desulfurization of gasoline as described in Embodiment 5 and Embodiment 6 of the present invention not only can reduce sulfur content in the gasoline feedstock to below 10 ppm, but also can control olefin content to below 24%, and loss of octane number is only 0.5.

Comparative Embodiment 1

After preparing a ZSM-5 type zeolite subjected to alkali treatment according to the method described in Embodiment 1, the ZSM-5 type zeolite subjected to alkali treatment is subjected to incipient wetness impregnation with a $K_2SO_4$ solution and a $NiSO_4$ solution according to the method described in Embodiment 1 sequentially, and washing, drying and calcinating, thereby preparing a desulfurization adsorbent. Upon detection, a sulfur capacity of the desulfurization adsorbent is 0.286, and its lifespan is only 3-4 h.

Comparative Embodiment 2

After preparing an active carbon subjected to alkali treatment according to the method described in Embodiment 1, the active carbon subjected to alkali treatment is subjected to incipient wetness impregnation with a $K_2SO_4$ solution and a $NiSO_4$ solution according to the method described in Embodiment 1 sequentially, and washing, drying and calcinating, thereby preparing a desulfurization adsorbent. Upon detection, a sulfur capacity of the desulfurization adsorbent is 0.236, and its lifespan is only 3-4 h.

Comparative Embodiment 3

Placing a ZSM-5 type zeolite (without alkali treatment) and an active carbon (without alkali treatment) in Embodiment 1 into a mortar to ground after directly mixing them at a mass ratio of 40:60, then placing it in an oven at a temperature of 120° C. to be dried for 6 h, thereby preparing a composite carrier.

The composite carrier is subjected to incipient wetness impregnation with a $K_2SO_4$ solution and a $NiSO_4$ solution according to the method described in Embodiment 1 sequentially, and washing, drying and calcinating, thereby preparing a desulfurization adsorbent. Upon detection, a sulfur capacity of the desulfurization adsorbent is 0.155, and its lifespan is only 2-3 h.

Finally, it should be noted that the foregoing examples are merely intended for describing technical solutions of the present invention rather than limiting the present invention. Although the present invention is described in detail with reference to the foregoing examples, those skilled in the art should understand that: they may still make modifications to the technical solutions described in the foregoing examples, or make equivalent replacements to some or all technical features thereof; however, these modifications or replacements do not make the essence of corresponding technical solutions depart from the scope of the technical solutions in the examples of the present invention.

What is claimed is:

1. A method for deep desulfurization of gasoline, comprising steps of:
    cutting a gasoline feedstock into a light gasoline fraction, a medium gasoline fraction, and a heavy gasoline fraction;
    subjecting the medium gasoline fraction to adsorption desulfurization to obtain a desulfurized medium gasoline fraction;

subjecting the heavy gasoline fraction to selective hydrodesulfurization to obtain a desulfurized heavy gasoline fraction; and mixing the light gasoline fraction with the desulfurized medium gasoline fraction and the desulfurized heavy gasoline fraction to obtain a desulfurized gasoline;

wherein, a cutting temperature of the light and the medium gasoline fractions is 35-60° C., and a cutting temperature of the medium and the heavy gasoline fractions is 70-130° C.;

wherein the adsorption desulfurization is conducted using a desulfurization adsorbent, the desulfurization adsorbent is obtained by loading an active metal component onto a composite carrier made of zeolite and active carbon which are subjected to alkali treatment respectively, wherein, the active metal is selected from one or more elements of IA, VIII, IB, IIB and VIB groups in the periodic table;

the method further comprising: washing the desulfurization adsorbent which has been subjected to the adsorption desulfurization with a steam to collect a sulfur-rich component; and subjecting the sulfur-rich component and the heavy gasoline fraction to the selective hydrodesulfurization after mixing them together.

2. The method for deep desulfurization of gasoline according to claim 1, wherein, before cutting the gasoline feedstock into the light, the medium and the heavy gasoline fractions, the gasoline feedstock is firstly subjected to demercaptan treatment.

3. The method for deep desulfurization of gasoline according to claim 1, wherein, before the mixing, the light gasoline fraction is firstly subjected to demercaptan treatment to obtain a demercaptan light gasoline fraction, and then the demercaptan light gasoline fraction is mixed with the desulfurized medium gasoline fraction and the desulfurized heavy gasoline fraction to obtain the desulfurized gasoline.

4. The method for deep desulfurization of gasoline according to claim 3, wherein, the demercaptan light gasoline fraction is mixed with the desulfurized medium gasoline fraction and the desulfurized heavy gasoline fraction after being subjected to adsorption desulfurization to obtain the desulfurized gasoline.

5. The method for deep desulfurization of gasoline according to claim 1, wherein, in the composite carrier, the zeolite and the active carbon have a mass ratio of (20-80):(80-20).

6. The method for deep desulfurization of gasoline according to claim 1, wherein, the zeolite is an X type, a Y type or a ZSM-5 type zeolite.

7. The method for deep desulfurization of gasoline according to claim 1, wherein, the active metal is at least two selected from Ni, Fe, Ag, Co, Mo, Zn and K.

8. The method for deep desulfurization of gasoline according to claim 1, wherein, the active metal has a loading of 2-30 mass % on the composite carrier, based on the total amount of the composite carrier and the active metal.

9. The method for deep desulfurization of gasoline according to claim 1, wherein, the light gasoline fraction is mixed with the desulfurized medium gasoline fraction and the desulfurized heavy gasoline fraction after adsorption desulfurization to obtain the desulfurized gasoline.

10. The method for deep desulfurization of gasoline according to claim 1, wherein, the adsorption desulfurization is conducted using a fixed bed at an atmospheric pressure, and a temperature of the adsorption desulfurization is controlled between 20-100° C., a flow rate of the medium gasoline fraction is 0.3-1 mL/min.

11. The method for deep desulfurization of gasoline according to claim 1, further comprising:

after washing the desulfurization adsorbent which has been subjected to the adsorption desulfurization with the steam, drying the washed desulfurization adsorbent with nitrogen at a temperature of 200-400° C., and cooling the dried desulfurization adsorbent with nitrogen to realize regeneration of the desulfurization adsorbent.

12. The method for deep desulfurization of gasoline according to claim 1, wherein, the heavy gasoline fraction and hydrogen are subjected to selective hydrodesulfurization in the presence of a selective hydrodesulfurization catalyst to obtain desulfurized heavy gasoline fraction, wherein, a temperature of the selective hydrodesulfurization is 200-300° C., a pressure thereof is 1.5-2.5 MPa, a liquid hourly space velocity is 1-5 h-1, and a volume ratio of hydrogen to oil is 400-600.

13. The method for deep desulfurization of gasoline according to claim 12, wherein, the selective hydrodesulfurization catalyst is obtained by a carrier loading an active metal component, wherein the carrier is a zeolite or a metal oxide, and the active metal comprises Co and Mo.

14. The method for deep desulfurization of gasoline according to claim 13, wherein, Co and Mo have an overall loading of 5-20% on the carrier.

* * * * *